United States Patent
Flanders et al.

(10) Patent No.: US 9,705,934 B2
(45) Date of Patent: Jul. 11, 2017

(54) OIL FIELD PROCESS CONTROL SYSTEM

(71) Applicant: Saudi Arabian Oil Company, Dhahran (SA)

(72) Inventors: Patrick S. Flanders, Dhahran (SA); Abdelghani Daraiseh, Dhahran (SA); Saeed Abeediah, Dhahran (SA); Ralph Hartman, Dhahran (SA); Abdullah Al-Nufaii, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 14/936,015

(22) Filed: Nov. 9, 2015

(65) Prior Publication Data

US 2016/0065622 A1 Mar. 3, 2016

Related U.S. Application Data

(62) Division of application No. 14/206,350, filed on Mar. 12, 2014, now Pat. No. 9,219,760.

(60) Provisional application No. 61/777,142, filed on Mar. 12, 2013.

(51) Int. Cl.
| | |
|---|---|
| *H04L 29/06* | (2006.01) |
| *H04L 12/46* | (2006.01) |
| *H04L 12/66* | (2006.01) |
| *H04L 12/26* | (2006.01) |
| *H04L 12/701* | (2013.01) |
| *G05B 19/418* | (2006.01) |
| *G06F 11/20* | (2006.01) |
| *G06F 11/30* | (2006.01) |
| *H04L 29/08* | (2006.01) |
| *H04L 12/40* | (2006.01) |
| *H04L 12/44* | (2006.01) |

(52) U.S. Cl.
CPC ...... *H04L 65/1033* (2013.01); *G05B 19/4185* (2013.01); *G06F 11/20* (2013.01); *G06F 11/30* (2013.01); *H04L 12/4625* (2013.01); *H04L 12/66* (2013.01); *H04L 43/0817* (2013.01); *H04L 45/00* (2013.01); *H04L 65/80* (2013.01); *H04L 69/08* (2013.01); *H04L 67/12* (2013.01); *H04L 2012/4026* (2013.01); *H04L 2012/445* (2013.01); *Y04S 40/168* (2013.01)

(58) Field of Classification Search
CPC . H04L 65/1033; H04L 12/4625; H04L 12/66; H04L 43/0817; H04L 45/00; H04L 65/80
USPC .......................................................... 370/401
See application file for complete search history.

(56) References Cited

PUBLICATIONS

Anonymous: "Foundation for Remote Operations Management", 2011, pp. 0-9, XP055125362, Retrieved from the Internet: URL: http://www.fieldbus.org/images/stories/enduserresources/technicalreferences/documents/foundation for remote operations_management.pdf.*

* cited by examiner

*Primary Examiner* — Ronald B Abelson
(74) *Attorney, Agent, or Firm* — Abelman, Frayne & Schwab

(57) ABSTRACT

An oil field process control system including a field versatile control gateway component that interfaces with a plurality of field devices using a broad range of hardwired and wireless protocols, offering in-the-field monitoring and control of each of the field devices and communicates with a remote central control room, exchanging data between the control room and the field using a multiplexed protocol that offers high data speeds and bandwidth, enabling a significant reduction of the amount of wiring, and conduits and other infrastructure expenses that would otherwise be incurred for such a highly reliable communications system.

16 Claims, 8 Drawing Sheets

OIL FIELD PROCESS CONTROL SYSTEM

RELATED APPLICATIONS

The present application is a divisional of U.S. patent application Ser. No. 14/206,350, which claims the benefit of U.S. Provisional Patent Application No. 61/777,142 filed on 12 Mar. 2013, the disclosure of which is incorporated herein by reference in its entireties.

FIELD OF THE INVENTION

This invention relates to the routing of multiplexed process control and safety signals from the central control room of a petrochemical plant or gas/oil separating plant to field devices via a high-speed digital communications network; and the invention also relates to a field-mounted control interface that provides for control in the field or logic in the field for a diverse set of oil field control devices.

BACKGROUND OF THE INVENTION

Conventional design practice is to route individual process control and safety signals from the process interface building (PIB) and/or the central control room (CCR) to field devices, including sensors and final elements. Sensors can include pressure switches and transmitters, level switches and transmitters, temperature switches and transmitters, position and limit switches, vibration monitors, among other instruments. Final elements can include electric solenoids, actuators and positioners for controlling the starting and stopping of motors, the speed of such motors, the opening and closing of valves either fully or to a particular position, and so forth. Where field devices require separate power, this is also conventionally provided from the PIB or CCR. These prior art designs require numerous control system input/output (I/O) racks at the PIB or CCR and large quantities of cables and conduit to and from the field. The introduction of Fieldbus Foundation (FF) H1 technology offered the ability to "multi-drop" instruments at the field level. However, the net cost savings achieved by major petrochemical projects due to reduction in field wiring with FF H1 systems has been limited due to the 31.25 Kbit/sec communications speed, which limits the number of field devices that could effectively share a common FF H1 segment. In addition, FF H1 systems and other conventional control systems require large system rack cabinets within the CCR or PIB to provide the field-to-control system interface. Existing conventional "remote I/O" technology falls short of providing a completely stand-alone termination, power supply, state-based logic, and signal conversion capability.

What is required is a system that enables the conversion of instrumentation and control signals to be converted to high speed digital communications "in the field" instead of within the vendor I/O racks in the CCR or PIB. Such a system would greatly reduce the number of interconnecting hardwired cables, conduits, cable trays and other raceways that currently must to be routed between the field mounted junction boxes and the PIB or CCR, as well as reducing the number of rack cabinets required within the CCR or PIB. This significant reduction in plant hardware and infrastructure requirements would provide substantial costs savings.

Such a system would provide the end user with greater flexibility to communicate with a diverse set of field devices over a common high speed digital communications network.

Also comprehended is a field-mounted control interface, in which a field versatile control gateway (FVCG) mounted within a smart junction box (SJB) allows connectivity within a single enclosure of a diverse set of oil field control devices, such as sensors and valves deployed at oil/gas wellsites. The FVCG/SJB provides a complete control function in the field of monitoring critical inputs, checking parameters against allowable limits and executing required actions to provide for safe and reliable oil/gas wellsite operations. The FVCG/SJB includes provisions for conversion of the multitude of field communications protocols used in the industry, the ability to recognize device level "health" diagnostic indicators and apply local state-based logic to enhance reliability and safety of the overall safety instrumented function (SIF) based on user-defined criteria, taking into account criteria such as required risk reduction, appropriate response to faults, and the installed device redundancy. Communications back to the central control room is made via the high speed communications enabled by the FVCG/SJB.

For convenience, the following is a listing of abbreviations of terms that are used in discussing the prior art and describing the invention:

CCR: central control room
CPU: central processing unit
DCS: distributed control system
EI: Ethernet Interface
ESD: emergency shutdown
FF: Fieldbus Foundation
FVCG: field versatile control gateway
I/O: input/output
ISA100: a wireless protocol of the International Society of Automation (ISA)
HSL: High Speed Link using single-mode fiber, multi-mode fiber, and Ethernet
ISCI: Intelligent safety and control integrator
JB: junction box
PIB: process interface building
PRC: plant routing controller
SIF: safety instrumented function
SJB: smart junction box

SUMMARY OF THE INVENTION

The present invention comprehends a process control system for the interconnection of various plant instruments and systems in the field and in the control room while minimizing interconnecting wiring, CCR or PIB interface equipment, power/energy supply modules, and associated conduit, cable trays and raceways and other infrastructure requirements. One key element of the system is that it provides for a combination of (1) field device interface, (2) local control, and (3) signal conversion technology at the field level. The system supports and enables control-in-the-field and logic-in-the-field, field device power and wiring interface, and signal conversion (for both hardwired and wireless sensors and final elements). The system of the present invention allows multi-variable control in the field with fast sampling and control response time.

The reduction in wiring from the field to the CCR or PIB is made possible through the use of field versatile control gateways (FVCGs). The FVCGs provide the interface to conventional field devices and make the signal conversion required to output process control and safety information over a high speed digital communications network. Data can be passed between FVCGs, and between a single FVCG and a number of field devices, via hardwired communications, wireless communications, or both hardwired and wireless communications, in order to enhance reliability.

The FVCGs, which are distributed at predetermined locations throughout the process facility, communicate with a versatile control interface that resides within the CCR or PIB. The versatile control interface collects the process control and safety signals from the FVCGs that have been transmitted via high speed digital communications and routes them to a central versatile control switch. The central versatile control switch performs the advanced routing capabilities of a completely integrated process control and safety system with smart capabilities to network with adaptive logic and simulation and plant routing controller functions.

The logic for operational control is shared between the FVCG and the distributed control system (DCS). The system can be configured so that for certain control applications, the DCS has primary control and the FVCG has secondary control, whereas for other control applications, the FVCG has primary control and the DCS has secondary control. Similarly the logic for emergency shutdown control is shared between the FVCG and the plant's central logic solver, with the FVCG having primary control for certain applications and secondary control for other applications. In all cases, if there is a failure of the primary control device, control will shift to the secondary control device. As used herein, the term "central logic solver" refers to a dedicated, programmable control system used in traditional emergency shutdown systems to manage all the inputs and outputs associated with the safety isolation function. The "central logic solver" is usually provided as a completely separate and independent system from the regulatory control system (referred to as the DCS). The concept introduced by this application is to locally manage the complete safety function associated with a wellhead and to limit communications with the "central logic solver" to a coordination level as needed via the high-speed digital communications enabled by the FVCG.

In one embodiment, the DCS monitors the FVCG (such as monitoring the health of the FVCG, monitoring critical alarms pertaining to the FVCG, and measuring the CPU execution time of the FVCG), allowing the DCS to determine whether the FVCG is overloaded or degraded. If such a determination is made, then responsibility for control functions is transferred from the FVCG to the DCS, and the FVCG will act as a pure communications and trunking module, and not as a control module. Thus, the FVCG can operate in two modes: in Mode 1 as a communication device where information is passed through the devices, and in Mode 2 as a control and communications device.

In another embodiment, the FVCG provides the ability to configure user-defined safety system degradation states used within the safety system voting, based upon the smart field device self-diagnostics and the risk associated with the specific safety instrument function (SIF).

In another embodiment, the FVCG provides a time stamp of each smart field device self-diagnostic fault with a clock synchronized with the plant-wide ESD system; communicates the presence of detected faults to the central ESD system, to the DCS and/or to a local control panel; and collects the elapsed time when device faults are present and wherein the FVCG may be configured to take the related process to a safe state after a defined length of time during which a device (or combination of devices) is in the degraded or fault state.

In another embodiment, the system monitors the temperature, humidity, loading level and vibration experienced by the FVCG. If the parameters exceed a predetermined norm, a common trouble signal is sent to the DCS, and control functions ordinarily conducted by the FVCG will shift to the DCS, and emergency shutdown functions ordinarily conducted by the FVCG will shift to the ESD controller.

In yet another embodiment, when an oil/gas well is remote from a main processing plant, a local FVCG will provide logic-in-the-field for control functions, testing, maintenance, and equipment upgrades.

The FVCG/SJB can replace the prior art field-mounted junction boxes (JBs). The FVCG/SJB serves the following functions: (1) interface for multiple field devices, (2) signal and protocol conversion, (3) power supply and power conditioning for field devices, preferably with redundant power supply provided to each FVCG, (4) wiring termination for FF H1 segments and terminal blocks with short-circuit protection for field sensors and final elements.

The FVCG serves as the connection point to each field device, i.e., the individual process sensors and final elements. The wiring terminations from each field device are connected with the FVCG termination module (both segregated conventional 4-20 mA terminals and FF H1 spur connections are provided). The FVCG termination module provides the physical termination of field device wiring and performs the required short circuit and open circuit detection of connected FF H1 spurs and other conventional control signal wiring. In addition, the power supply and power conditioning for the field devices is provided via the FVCG termination module. For FF HI circuits, the FVCG termination module combines the functions of existing FF H1 device couplers and FF H1 segment power supplies and power conditioners.

Individual "pairs" or individual FF "spurs" are terminated in segregated sections of the termination module taking the place of the conventional FF device couplers and eliminating the need for FF segment "trunk" terminations, as well as diagnostic and power supply modules within the system cabinet at the FF H1 host interface. The system of the present invention completely eliminates the "trunk" cables that are now required between FF device couplers, the FF power supply and conditioners, and the FF H1 host interface. The FVCG provides the function of a Smart Wireless Trunk Module and serves as the interface between the high speed digital communications and the field signal wiring environments.

In addition, each FVCG provides diagnostics of the state of each of the hardwired H1 spurs and high speed digital communications with other FVCGs. At the control system interface end, the central versatile control switch receives commands from the plant routing controller to ensure that the FVCG signals are made available over either the hardwired high speed communications links or the wireless communications mesh. In this way, the system provides a highly reliable means to pass control information to and from the field devices and higher level control systems. As is known in the art, networks typically have central routers and peripheral routers. In this application, the plant routing controller is the central router for routing data across the process control system, whereas the FVCG provides a peripheral routing function. As is understood in the art, a plant routing controller includes a process, memory, and monitor to provide operator interface, allowing the operator to monitor and diagnose the existing status of the entire plant routing, The plant routing controller also allows users to enter rules for specific routing or alternative routes. In the context of this invention, the plant routing controller ensures that the routing tables across the FVCGs and central versatile control switch are aligned, without contradicting routing rules.

The new FVCG termination module monitors the health of the primary hardwired communications signals and the wireless communications channel, which uses the International Society of Automation (ISA) ISA100 protocol. Should a fault be detected on the hardwired field device signal, e.g., by way of a healthy wireless channel, the new interface will switch to the ISA100 wireless communications path providing seamless communications to the versatile control interface and the central versatile control switch. If at any time, the FVCG termination module detects a fault in the wireless communications channel, e.g., by way of a healthy hardwired H1 trunk an error message will be sent to the central control system to alert the operator that a problem exists with the device's wireless communications. The FVCG contains smart logic and is programmed to act when the connection to the CCR is interrupted, allowing continued operation of the subsystem.

Each FVCG includes a bulk power supply that is preferably fed from n-redundant primary power circuits, sourced either from the CCR, from the PIB, or from both. In an alternate embodiment, the power supply is fed from either the CCR or PIB, with redundancy provided by a battery system with a solar charger. In an alternate embodiment that is especially suitable for remote areas, such as monitoring a remote oil or gas well, the power supply can be fed from a single (i.e., non-redundant) battery with an associated solar charger. The FVCG distributes the power to internal FVCG modules via a power supply distribution system.

The FVCG receives signals from both hardwired and wireless instruments and multiplexes them so that many signals can pass over a single high-speed digital communication output. This allows the process control and safety data of increased numbers of field mounted devices to be routed within the plant environment on a single (redundant) pair of wires. The present invention combines the application of new wireless technology with signal conversion and high speed communications to offer significant reductions in field wiring and raceways, resulting in significant cost savings for large-scale projects.

The FVCG is equipped with state-based communications logic to monitor both the hardwired and the wireless links to each device and execute user-defined action upon lost or degraded communications. This state-based communications logic is described within U.S. Pat. No. 7,869,889, which is hereby incorporated by reference. This expanded monitoring and remedial action capability offers flexibility to the instrumentation/control system designer that is not possible using the prior art systems.

The invention also provides for enhanced control for an intelligent oil field (I-Field), by integrating the FVCGs integrating with the main plant DCS. In case of an FVCG failure, the main plant DCS can provide backup control of affected wells. For an I-Field, which typically consists of several oil and gas wells, production level and type are two important variables used in determining the profitability of the facility and minimizing storage requirements. For example, in order to fulfill contract requirements and/or to maximize profit, a number of hydrocarbon products (with specific percentages of each) may be needed. The main DCS system can determine the required level and type of production for each well and transmit this information to each well's FVCG, which will control the field devices for that well in accordance with the requirement received from the DCS. This process can be dynamic in nature and can be modified or adjusted several times every day. The systems and methods of the prior art require manual adjustment of the production level and type at each well, leading to sub-optimal tuning of production level and type. In contrast, the use of an FVCG at each well will allow rapid and accurate control based on a high sampling rate. This provides a more dynamic process control, a higher yield, a minimization of excess storage capacity and increased profitability. In the event of a communications failure of the common link, the system includes the installation of redundant signal converters at the field junction box level, redundant communications links between FVCGs, and improved capabilities to re-route the communications using the plant routing controller.

Non-critical control devices, e.g., monitoring instruments or sensors, can communicate with the FVCG without redundancy, such as using only a wireless connection. The FVCG continually monitors the wireless communications for overall health, and in the event that a wireless communications fault is detected, the interface transmits an alarm to the process control system. As some control circuits are critical in nature, a redundant signal conversion function is included in the FVCG. Critical service control devices can communicate with the FVCG using hardwired communications only or via wireless and hardwired communications in a dual-redundant fashion, taking advantage of the internal FVCG state-based logic. If a fault is detected on the hardwired communications path between FVCGs, and a healthy wireless path is available, the interface will switch to the wireless path and alert the plant routing controller that trouble was detected on the primary hardwired link. The internal FVCG communications logic within the FVCG allows the end-user to define how the device will react when faults are detected within the field device to FVCG interface. In this way, a dual redundant communications path is optionally available, if needed, between the field devices and the connected signal converter and between individual field versatile control gateways (FVCGs).

The FVCG combines existing conventional communications protocol, e.g., FF H1 or analog signals, emerging ISA100 wireless communications technology, and the application of new wireless enabled smart safety instruments, described within U.S. Pat. No. 7,869,889, which is hereby incorporated by reference. The flexibility offered by the novel system and apparatus provides dual redundant communications interfaces at the field level when required or simplex communications with either wireless or hardwired field mounted instruments, facilitates additional reductions in the costs associated with the installation of field device cabling.

The novel FVCG interface includes logic to perform process control and multi-variable control. The FVCG logic facilitates easier implementation of multi-variable control in the field with rapid sampling and control response time. The FVCG acts as backup for the centralized DCS in case the DCS is temporary out of service, operating under a heavy load, or under upgrade. In the prior art, if the centralized DCS were out of service, the plant had to be shut down. The invention provides the messaging required to transfer the primary control of the process from local FVCG to central DCS and vice versa, in order to achieve a true redundant and distributed control system.

In contrast to the prior art which relies on third-party software packages to collect device diagnostics from smart field devices, which are then analyzed in the control room, input/output cards in the FVCG are able to receive the diagnostics from the smart field instruments and make decisions in the field based upon the diagnostics. This is a chip level/software-based feature build into the input/output cards and commercially available through protocols such as HART and Fieldbus Foundation. For example, smart valves today can detect when a solenoid valve failed to operate, when the main valve stem is broken, when the main valve is frozen, when the actuator pressure is too low, and other functions. This allows more complex voting logic alternatives in the field when multiple valves are in the same process line to maintain safety and operability than is possible with the prior art. In another example, in a prior art safety system design, local field control may have been designed with a two out of three voting logic, with only discrete diagnostic inputs, so that a "trouble" signal from one pressure transmitter would not have triggered protective action but would result in a degraded, 2-out-of-2 voted arrangement. With the new design and the ability of the FVCG to receive the diagnostics from the smart field instruments, the FVCG can see not only a "trouble" signal, but rather the actual pressure being registered by the affected pressure transmitter. The FVCG can therefore be programmed to utilize the remaining "healthy pressure transmitters" in a 1-out-of-2 or in a 2-out-of-2 voted arrangement based on the specific safety applications.

In one embodiment, smart valves protecting a flowline are controlled by an FVCG which monitors them using one out of three voting logic. If a fault is detected in one of the smart valves, the FVCG will recognize the fault and transmit an alarm signal to an operator in the control room. The FVCG will either command the other smart valves protecting that flowline to trip, or await a second failure of a smart valve on that flowline, e.g., two out of three voting logic, before initiating a trip of the flowline. The configuration of the FVCG can be accomplished in the field, including the ability to determine whether to act upon one out of three logic, two out of three logic, or the like. This field level adaptive use of device level diagnostics is not available in the existing art today.

With the system of this invention, process sensors and final elements can more readily be integrated with auxiliary applications such as adaptive logic and simulation, ESD controller, and the DCS, resulting in a new level of system integration. The system can also be integrated with the DCS and ESD controller via the ISCI (Intelligent Safety and Control Integrator), central versatile control switch and the plant routing controller.

The system and method of the present invention provides multi-variable control to the field level and process control enhancements now restricted by capabilities of conventional centralized control systems.

This unique combination of redundant and diverse communications paths between each field mounted FVCG will provide improved communications throughput with no loss of reliability.

BRIEF DESCRIPTION OF THE DRAWINGS

Preferred embodiments of the invention are described herein below with reference to the drawings wherein.

DETAILED DESCRIPTION OF THE INVENTION

Figure 1:
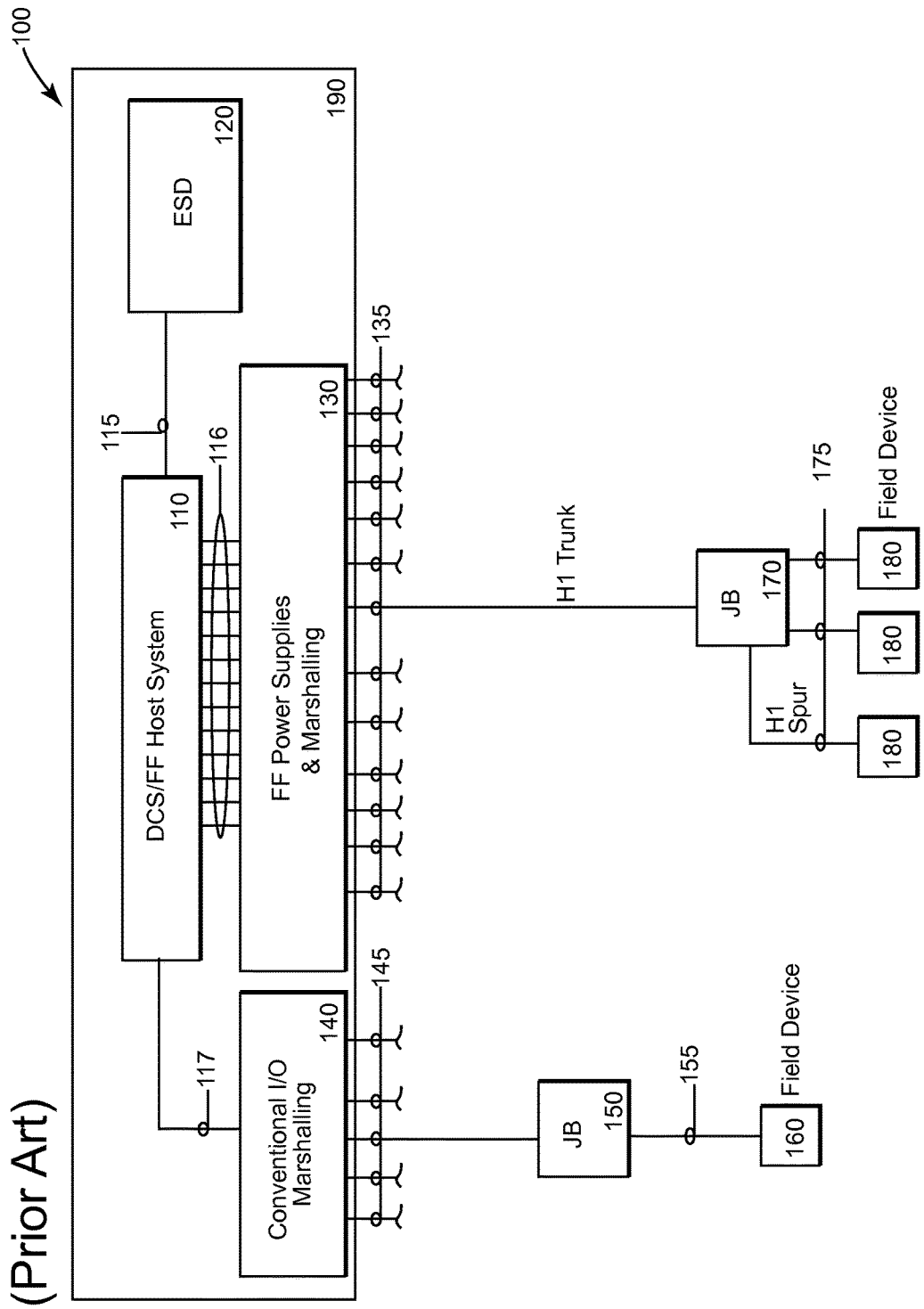
FIG. 1 illustrates prior art oil field process control system.

FIG. 1 schematically illustrates a prior art oil field process control system 100. Main plant DCS 110 is integrated with emergency shutdown (ESD) controller 120, via wiring 115 (typically high-speed Ethernet). The DCS is connected via cabling 117 to conventional input/output marshalling cabinets 140, and via cabling 116 to Fieldbus Foundation power supplies and marshalling cabinets 130. The DCS 110, ESD controller 120, and marshalling cabinets 130 and 140 can be located in a PIB or CCR 190.

The conventional I/O marshalling cabinets 140 are wired to numerous conventional field devices 160 via JBs 150, with cables 145 routed between the marshalling cabinets 140 and the JBs 150, and cables 155 routed between the JBs 150 and the field devices 160. These cables 145 and 155 typically include twisted shielded pairs for analog signals (such as 4-20 mA signals from pressure transmitters and 4-20 mA signals to proportional control valves) and nonshielded wires for discrete control signals (such as inputs from position switches, limit switches, torque switches, and the like, and "open" and "close" signals to valve controllers).

The FF power supplies and marshalling cabinets 130 are wired to numerous FF field devices 175 via JBs 170, with H1 trunk cable routed between the marshalling cabinets 130 and the JBs 170, and H1 spurs routed between the JBs 170 and the FF field devices 180.

Figure 2:
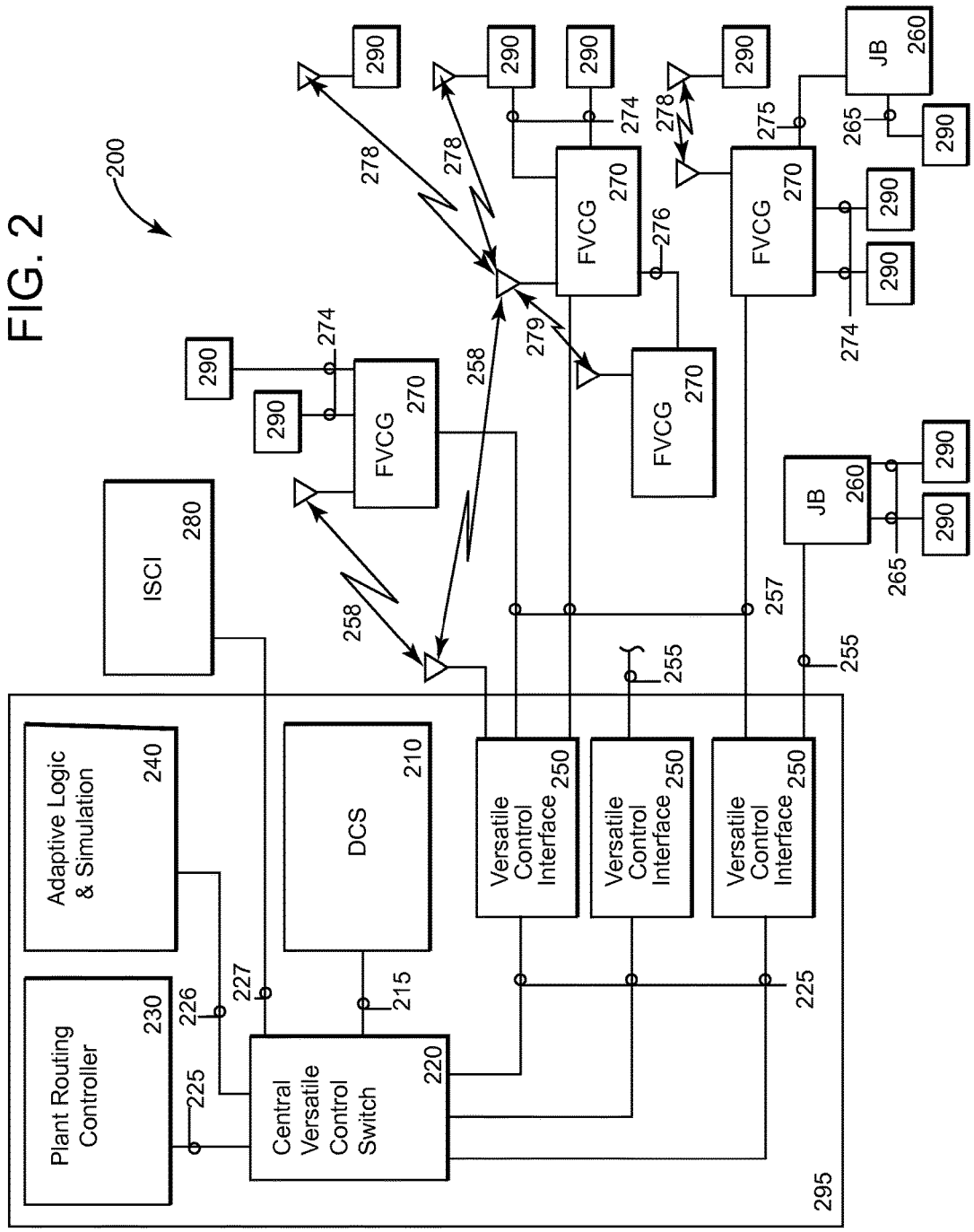
FIG. 2 illustrates the new oil field process control system.

FIG. 2 schematically illustrates an embodiment of the new oil field process control system of the new invention 200. The system is composed of four primary parts: the FVCGs 270 that interface with field devices, the versatile control interfaces 250 that collect data that is transmitted to and from FVCGs 270, a plant routing controller 230, and a central versatile control switch 220. The central versatile control switch 220 supports double or triple redundancy, so that if the primary circuit fails the secondary redundant circuit will take over, or in the case of triple redundancy, so that if both the primary and secondary circuits fail, the tertiary redundant circuit will take over. While three versatile control interfaces 250 are shown in FIG. 2, the specific number of devices depends on power limitations and the capacity of the central versatile control switch 220 to handle messages. If needed, an additional central versatile control switch 220 can be added to support additional versatile control interfaces 250. The new system configuration is unique in the arrangement of both the conventional communications and wireless ISA100 communications methods at the FVCG level and the conversion and routing of high speed digital communications at the field level, eliminating the need for various wiring cabinets that existed in the prior art. The flexibility of using "best in class" field instruments and connecting them all within a common FVCG/SJB as appropriate for wellsite control and safety requirements is the key element of this invention. The invention encompasses a local field interface with the flexibility to use hardwired analog signals, hardwired (multi-drop) Fieldbus Foundation signals, discrete (on/off) signals, wireless signals (ISA100, HART, etc.) in any combination as required to provide a self-contained local control system capable of monitoring and managing the control, safety and functional testing requirements at a wellsite and communicating status signals with the central control room of a main plant, such as a gas/oil separating plant (GOSP).

Main plant DCS 210 is connected to central versatile control switch 220 via wiring 215. The DCS is connected through the central versatile control switch 220 to a plant routing controller 230 (via wiring 225), to an adaptive logic and simulation unit 240 (via wiring 226), and to versatile control interfaces 250 (via wiring 225). The DCS 210, central versatile control switch 220, plant routing controller 230, adaptive logic and simulation device 240, and versatile control interfaces 250 are located in a PIB or CCR 295. The DCS 210 is also connected through the central versatile control switch to the ISCI 280 via wiring 227. The ISCI 280 is located in the field.

The versatile control interfaces 250 interface with numerous field devices 290. These interfaces can be made via conventional (prior art) JBs 260 of the prior art with cables 255 routed between the versatile control interfaces 250 and the JBs 260, and cables 265 routed between the JBs 260 and the field devices 290. The versatile control interfaces 250 can also interface with field devices 290 via the FVCGs 270 of the invention. The communication between the versatile control interfaces 250 and the FVCGs 270 can include hardwired paths 257 and wireless paths 258. The FVCGs 270 can communicate directly to field devices 290 via either a hardwired path 274 or a wireless path 278. FVCGs can also communicate with other FVCGs via either a hardwired path 276 or a wireless path 279. FVCGs can also communicate with prior art JBs 260, via hardwired path 275. Additional novel features of the present invention include new functions made possible by the introduction of the plant routing controller and the central versatile control switch that allow new levels of integration of emergency shutdown logic and adaptive logic.

Figure 3:
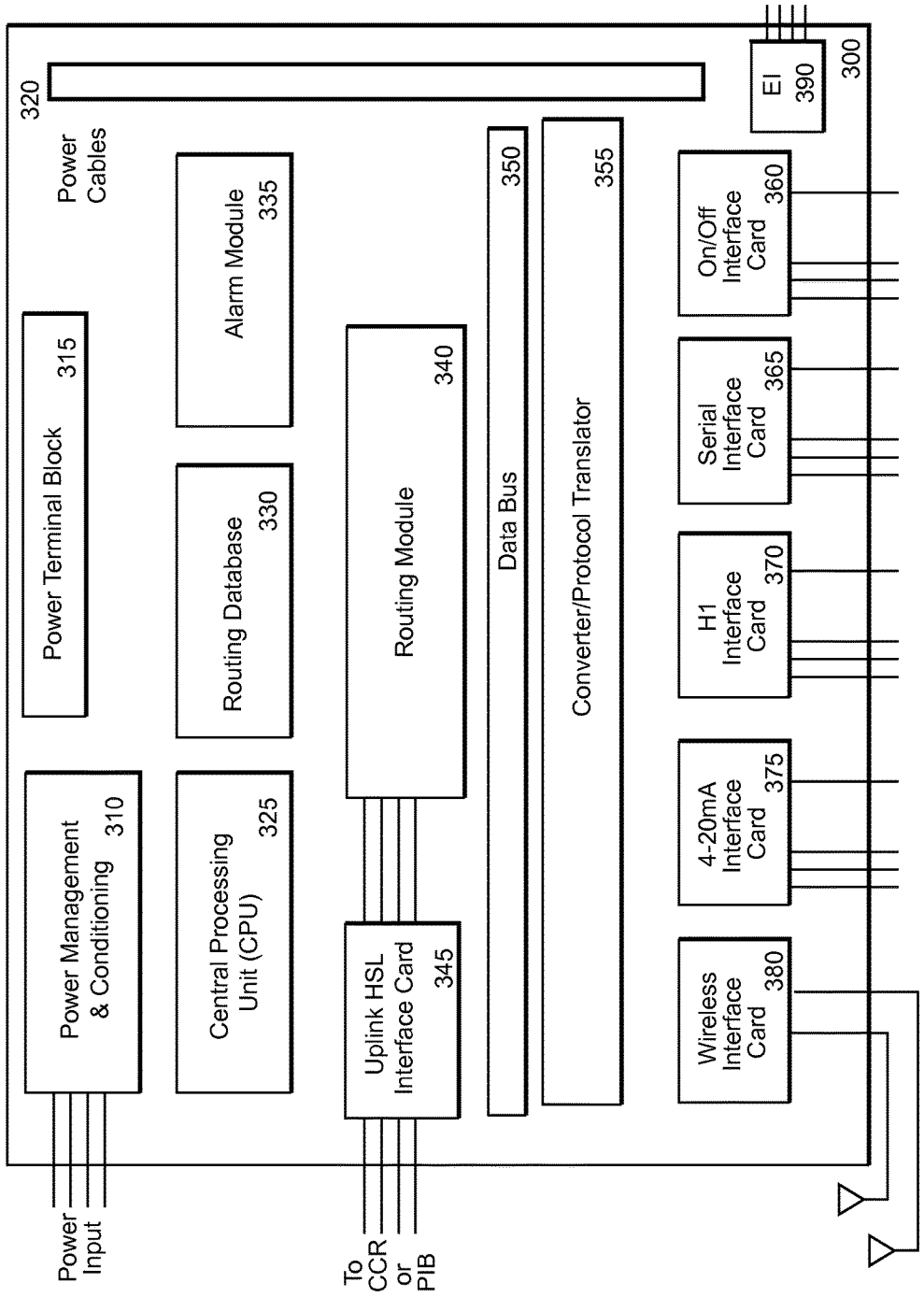
FIG. 3 illustrates components within the field versatile control gateway.

FIG. 3 schematically illustrates components of a representative components within the field versatile control gateway (FVCG) 300, which include a central processing unit (CPU) 325 with, e.g., a Windows-based operating system that provides control-in-the-field capabilities. Also included is a routing database 330 and routing module 340. Routing module 340 routes of data from field devices to and from the CPU 325, and also provides routing of data to and from other FVCGs and to and from the CCR or PIB. Routing module 340 also provides multicast of the same data packet over M+1 links. This designation means that one link is the primary link and "M" additional links serve as hot redundant standby links. If the originally designated primary link fails, e.g., due to continued CCR failure, the first designated redundant link will become the new primary link, and the failed primary will be designated as an out-of-service link. The M+1 link design ensures that critical data is accurately transported over the link connecting the FVCG to the CCR. Routing database 330 contains primary and alternative routes, instrument addresses and neighboring addresses, and is dynamically updated by the plant routing controller (PRC).

FVCG 300 also includes alarm module 335, power management and conditioning module 310 and power terminal block 315. Power management and conditioning module 310 not only provides power for the FVCG 300 internal electronics, but also supplies regulated power to field devices. Fuses or circuit breakers and transient voltage surge suppression devices (TVSS) are also included within the enclosure of FVCG 300. Power and communications are provided from FVCG 300 to field devices through a common cable. Alarm module 335 monitors the health of the wireless communications with the field devices. Diagnoses include: diagnosis of process signal health for transmitters (such as temperature, pressure, level, etc.), the health of device electronics, power fluctuation, the health of communications from and to the central control room, etc. The logic within FVCG 300 is configured by the user to take the appropriate action upon recognition of a diagnosed fault, based upon the risk associated with the wellsite control function, the type of fault detected and the redundancy provided.

FVCG 300 also includes uplink interface card 345, data bus 350 and power cables 320, and converter/protocol translator 355. The converter/protocol translator 355 provides the protocol translation/encapsulation, for example, from 4-20 mA, H1, EI, serial, wireless, or HSE, to the HSL format. The HSL format is based on single-mode fiber, multimode fiber and Ethernet communications that will provide the uplink to the CCR or PIB.

A number of interface cards can be used, including a wireless interface card 380, a 4-20 mA interface card 375, an H1 interface card 370, EI card 390, serial interface card 365, and an on/off interface card 360. The HSL uplink interface card 345 can be configured as standard Ethernet (IEEE 802.3) with 1 Gbps data rate, or as Fieldbus Foundation HSE. While prior art systems commonly include HSE and H1 links, it is foreseeable that H1 connections will be replaced by standard Ethernet (IEEE 802.3) with 100 Mbps link, and HSE connections replaced by standard Ethernet (IEEE 802.3) with 1 Gbps data rate.

FVCG 300 is modular in the sense that interface cards of various types (HDL, HSE, H1, 4-20 mA) can be added depending on the interface type needed for a particular process application. There are 8 slots for 4 redundant pairs of wired cards, with each card capable of interfacing with 32 field devices. The number of cards varies with the installation, and the number shown are for illustrative purposes only. All cards are provided as redundant pairs.

In addition, there are redundant wireless cards (only one wireless card is shown in the figure), consisting of two interfaces supporting star/mesh topologies for up to 256 field devices.

Finally, there is one redundant interface connecting FVCG 300 to the CCR or PIB; or, alternatively, connecting an FVCG to an intermediate FVCG connected to the CCR or PIB. The uplink interface card supports M-redundant high-speed data links, by multicasting the same data packet to the versatile control interface (VCI) over the M-redundant links to achieve mission-critical highly reliable communications. Communications between the FVCG and CCR or PIB can thus be conducted through the wired M-redundant link, or alternatively through the redundant wireless link, or alternatively through both the wired M-redundant link and redundant wireless link.

Thus, each FVCG 300 can support 128 wired inputs, 256 wireless connections, and an M-redundant high speed data link, e.g., an uplink to the CCR or PIB.

Figure 4:
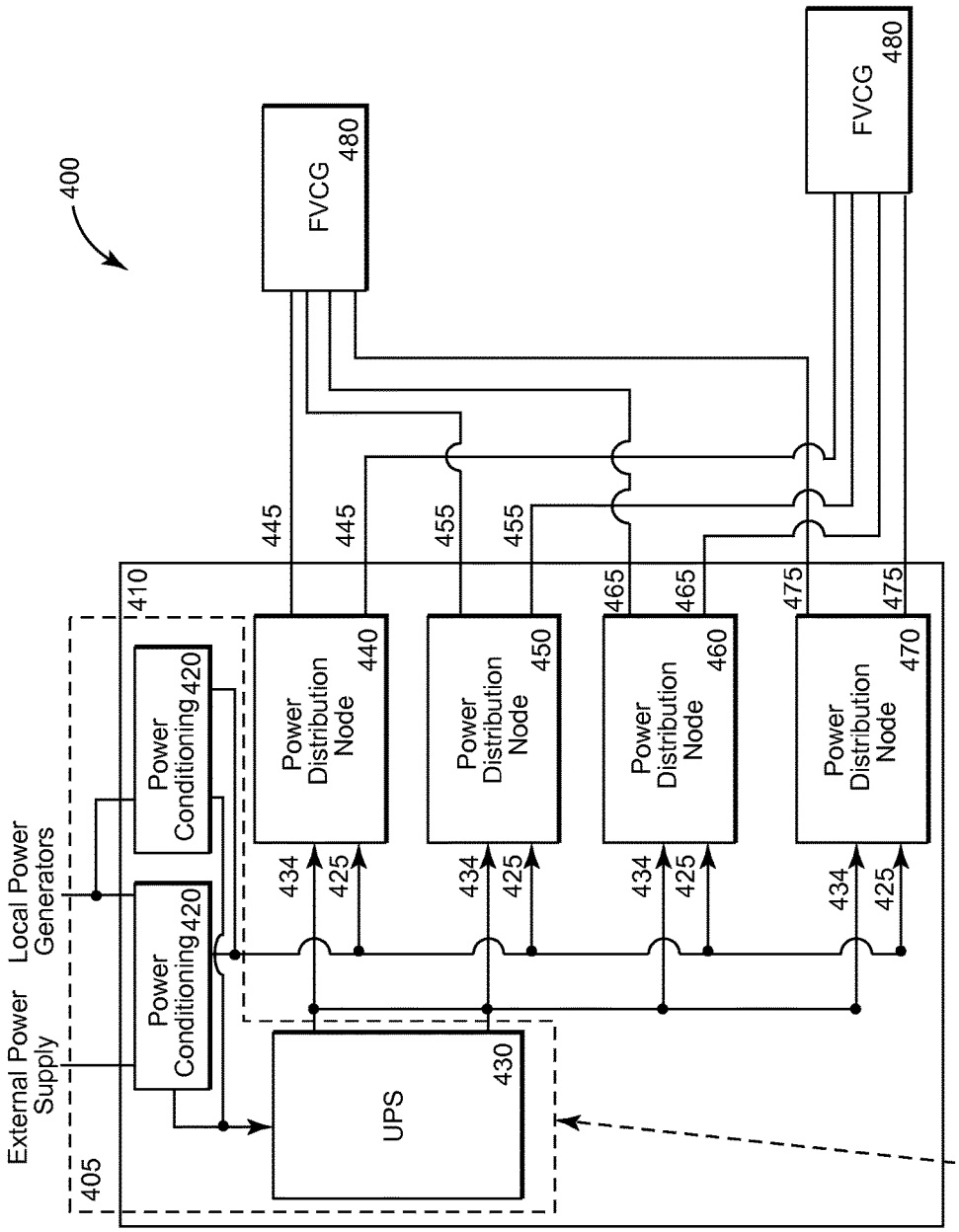
FIG. 4 illustrates power distribution to the FVCGs.

FIG. 4 illustrates an embodiment of a power distribution design for the system of the invention. Power enclosure 405 includes redundant power conditioning units 420 and a UPS 430. Also included are two or more power distribution nodes, with the embodiment showing four power distribution nodes 440, 450, 460 and 470. The power conditioning units 420 receive power from redundant sources, such as an external power supply, e.g., utility power, and local emergency generators, e.g., diesel or natural gas units. Each power distribution node 440, 450, 460 and 470 obtains its primary power from the external power supply; however, in the event that this power is interrupted, the UPS 430 will provide power until the emergency generators are started or the external power supply is restored.

Preferably, each FVCG 480 in the field is supplied by power from at least two power conditioning units (N+1), to ensure a very high level of reliability and availability of mission-critical power. In the embodiment shown, each FVCG 480 is fed by cables 445, 455, 465 and 475 from, respectively, power distribution nodes 440, 450, 460 and 470. FVCG 480 receives N+1 power cables, i.e., a primary cable and "N" redundant cables, to power the FVCG internal subsystems and provide power to the associated field devices. The power received from the CCR or PIB over the N+1 links is shared across the N+1 cables. Thus, the loss of one cable out of the N+1 will not have an immediate adverse effect on the availability of power required for operation of the FVCGs and associated field devices.

Figure 5:
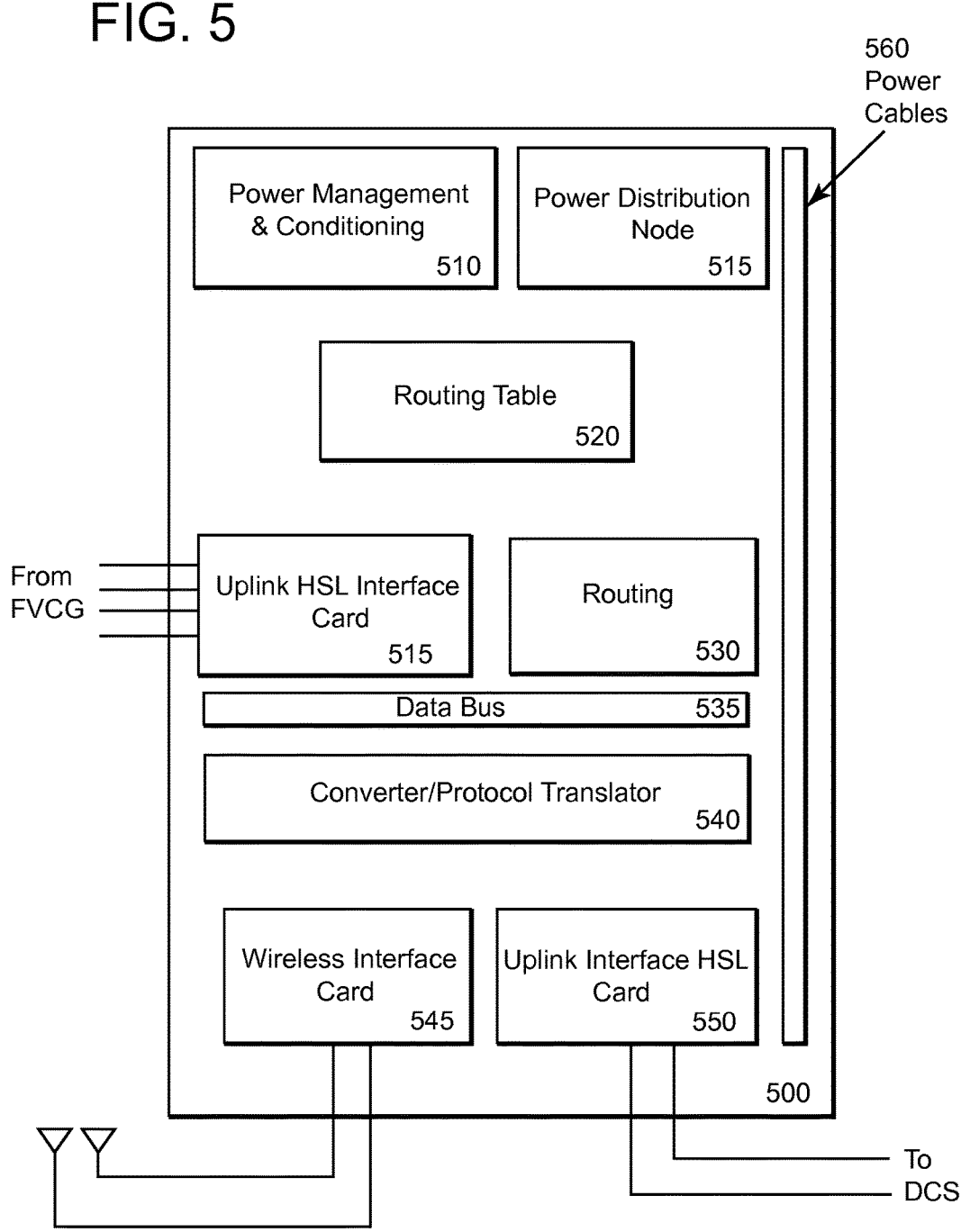
FIG. 5 illustrates components within the versatile control interface.

FIG. 5 schematically illustrates components of a representative versatile control interface 500 which include power management and conditioning module 510, power distribution node 515 and power cables 560. Also included are: routing table 520 that incorporates a processor and a memory (database) containing routes and algorithms for routing; routing module 530 that does the actual routing, whereby a received packet or message from a port is transferred to its output port based on the routes and algorithms of routing table 520; data bus 535; and converter/protocol translator 540. Also included is an uplink interface card 525 for communications with the FVCGs, an uplink interface card 550 to the DCS, and a wireless interface card 545.

The FVCG has two modes of operations:
1. Mode one as a smart controller as part of the plant control system complementing the functions of the DCS. In this mode, the FVCG provides a number of functions:
   a. A local process controller for local devices or units associated with the FVCG, including the ability to perform "control in the field."
   b. Routing across local units or equipment, and routing to and from the CCR.
   c. Protocol conversion across various field process devices and interfaces.
   d. Power management and feed to local devices associated with the FVCG.
   e. Serving as a redundant backup in the event of DCS failure.
   f. Multi-interface capabilities to various protocols.
   g. High speed connectivity to CCR.
2. Mode two as a smart safety controller as part of the plant safety and shutdown system complementing the functions of the ESD controller:
   a. Act as a local safety logic solver or controller for local devices or units associated with the FVCG, including the ability to performing "logic in the field."
   b. Routing across local units or equipment, and routing to and from the CCR.
   c. Protocol conversion across various field safety devices and interfaces.
   d. Power management and feed to local devices associated with the FVCG.
   e. Serving as a redundant backup in the event of ESD controller failure.
   f. Multi-interface capabilities to various protocols.
   g. High speed connectivity to CCR.

The FVCG can be used as a smart controller and communication interface/routing manager for the plant control system, or it can be used as safety controller and communication interface/routing manager as part of the overall plant safety system. However, the same FVCG cannot and should not be used for both, in order to ensure that the separation of the safety and control system within the plant.

A proportional-integral-derivative controller (PID controller) is a control loop feedback mechanism (controller) widely used in industrial and the process control systems. A PID controller calculates an "error" value as the difference between a measured process variable and a desired setpoint. The controller attempts to minimize the error by adjusting the process control outputs. The PID controller algorithm involves three separate constant parameters, and is accordingly sometimes called three-term control: the proportional, the integral and derivative values, denoted P, I, and D. Simply put, these values can be interpreted in terms of time: P depends on the present error, I on the accumulation of past errors, and D is a prediction of future errors, based on current rate of change. The weighted sum of these three actions is used to adjust the process via a control element such as the position of a control valve, a damper, or the power supplied to a heating element. The concept of "control in the field" was introduced by Fieldbus Foundation to allow classical "PID" type control to happen within a field device that was serving as the "master" for the other multi-drop devices. In other words, this allows PID control to migrate to the field level instead of being processed within the DCS or CCR. In this invention, "control in the field" is used to mean capturing information "on the bus" and using it to add value or make decisions within the FVCG.

Figure 7:
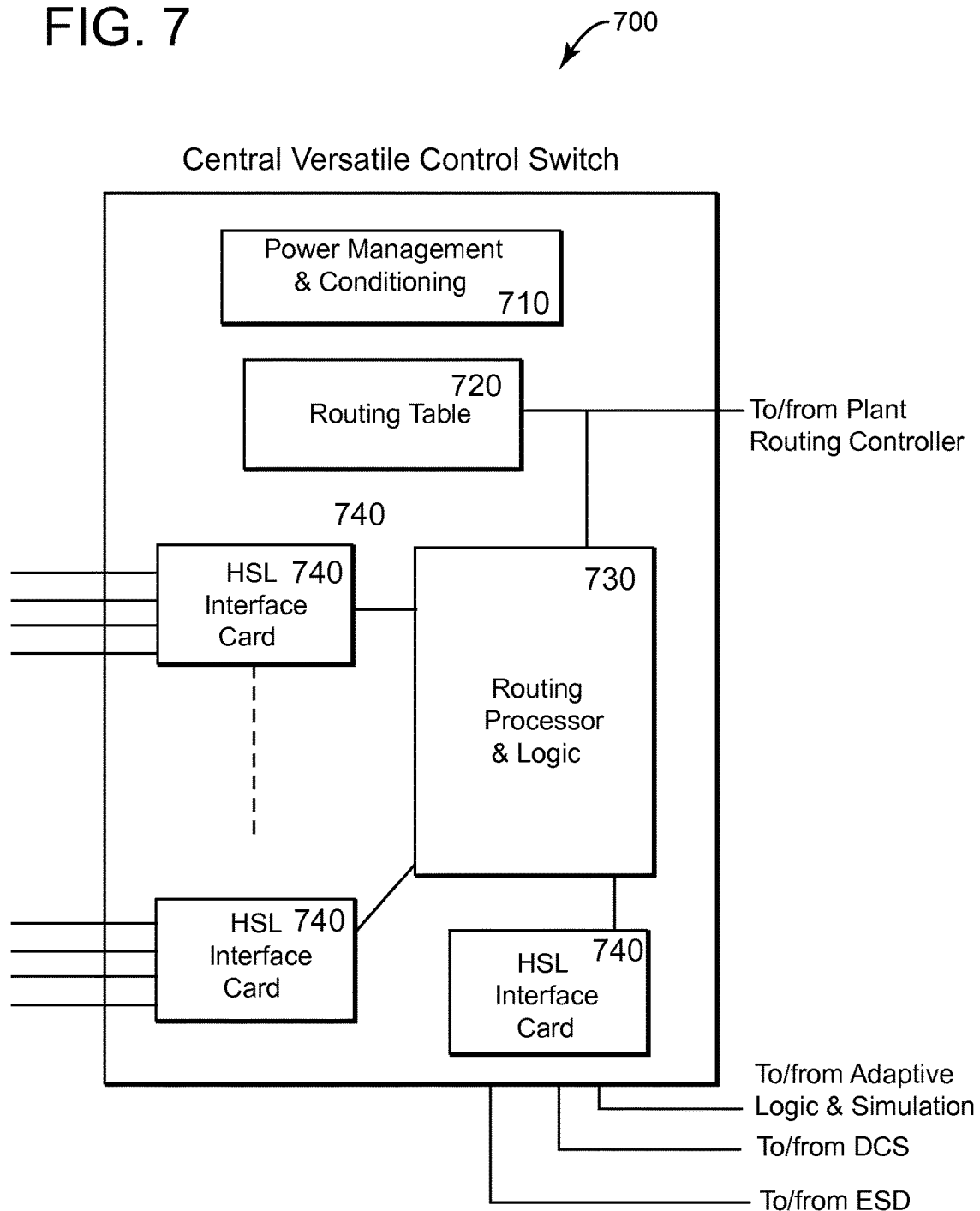
FIG. 7 illustrates a central versatile control switch.

Similarly the term "logic in the field" is used herein to refer to taking cause-and-effect type inputs and outputs (C&E) and relating them to each other to make decisions based on the inputs available to the smart "master" field mounted device via a bus architecture or a local controller such as the FVCG. Within this context, the FVCG will manage the multiple digital inputs/outputs or analog inputs/outputs of the I/O module at the local/field level instead of using the central ESD controller. Alternatively, the FVCG can act as a redundant or backup "logic solver" for the main and central logic solver. FIG. 7 illustrates the central versatile control switch 700, incorporating a power management & conditioning unit 710, a routing table 720, a routing processor and logic unit 730, and HSL interface cards 740.

Figure 6:
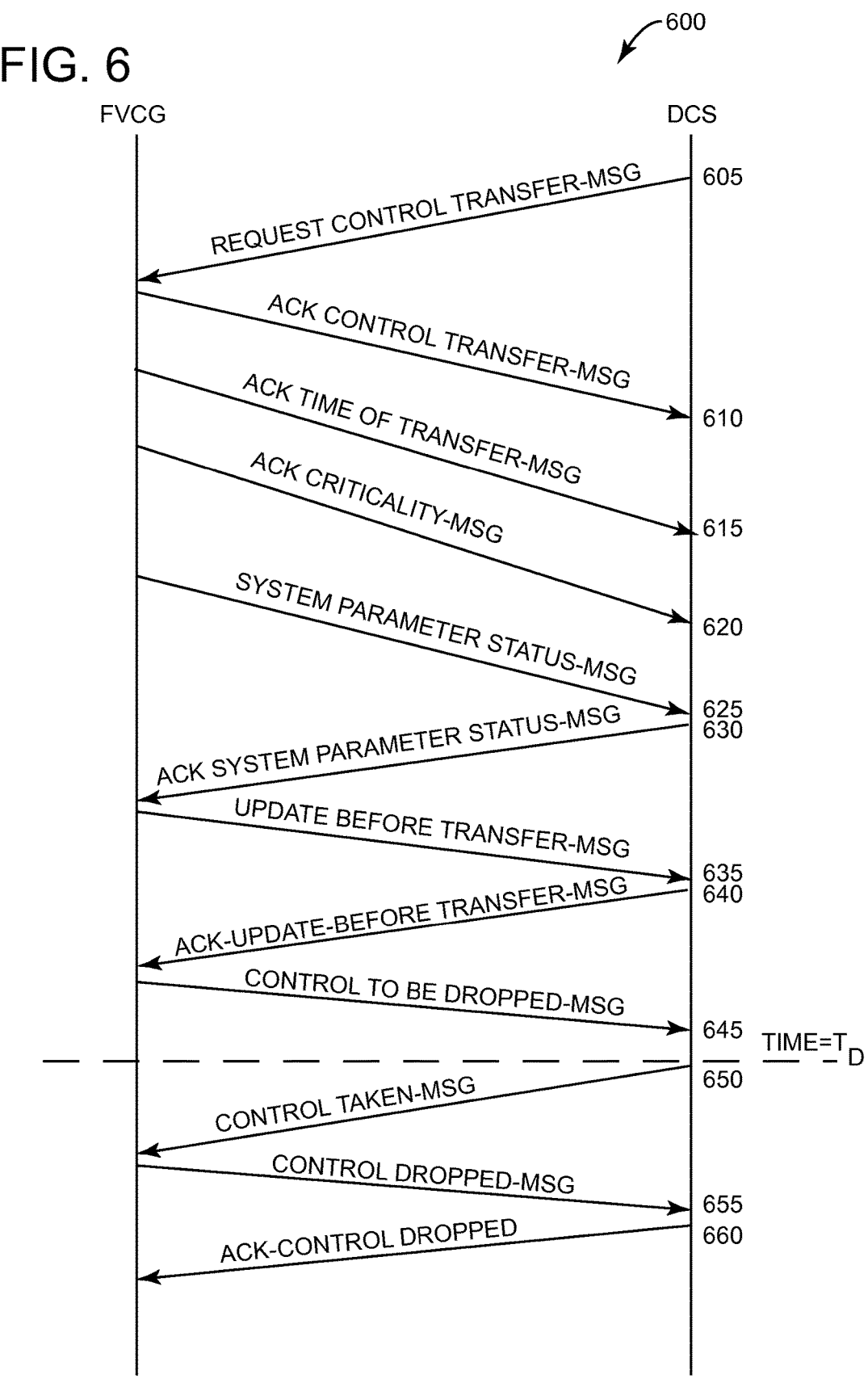
FIG. 6 illustrates a method of transferring control from the FVCG to the DCS.

FIG. 6 illustrates a method 600 in which a series of messages are exchanged reflecting a transfer of process control responsibility from the FVCG to the DCS, e.g., upon a determination being made that the FVCG is overloaded or degraded. In step 605, a "Request Control Transfer" message is sent from the DCS to the FVCG. A request message includes the following data:

| Destination Address | Source Address | Message Overhead | Command Type (1) | Reason for Control Transfer (2) | Time $T_D$ (3) | Criticality (4) | Components Involved (5) |
|---|---|---|---|---|---|---|---|

The command type, (1), can either be a command to transfer process control from DCS to FVCG, or to transfer process control from FVCG to DCS. In the example shown in FIG. 6, control is being transferred from the FVCG to the DCS.

The reasons for control transfer, (2), can include DCS failure, FVCG failure, failure of communications between the DCS and FVCG, an FVCG environmental condition, e.g., excess heat, humidity, vibration, loading level, a process disruption not controllable by the FVCG, a voluntary decision (such as conducted for maintenance or a testing requirement), or operator's intervention. An example of a process disruption not controllable by the FVCG would be a signal from a gas oil separating plant to decrease or cease production from an individual well. Both FVCG and DCS controls are needed, providing redundancy in the event of loss of local control or shutdown, in which case remote control or shutdown can be accomplished. In addition, some incidents that might not be detected locally at a FVCG might be detectable at a DCS in the central control room, such as a pipe leak remote from a well.

If there is a complete FVCG failure, the failure mode of each field device will be dependent upon the individual device configuration used. For example, a conventional smart valve controller communicating via 4-20 mA analog with HART diagnostics or Foundation Fieldbus to the FVCG will fail open or closed, as configured by the user. Because all communications is lost, the user will conservatively configure this fail-safe state to reduce exposure to risk. However, provided the FVCG remains healthy, additional options defined within the local state-based logic may be selected by the user when device level faults are detected within valves or process sensors to improve overall safety and reliability.

The time $T_D$, (3), is the time, such as 13:45.351, at which control should be transferred by the FVCG and assumed by the DCS, in the present example.

The message criticality (4) can be normal, critical, or emergency level. Message criticality outlines what functions are transferred from the DCS to the FVCG. For a "normal" status, the FVCG will monitor process conditions, alarms, and maintain diagnostic logs. For a "critical" status, the FVCG will additionally perform functions such as closed-loop control and open-loop control. For an "emergency" status, the FVCG will additionally perform emergency shut-down functions.

The components involved (5) will be the systems, components, and instruments, for which control is to be transferred from the FVCG to the DCS in the example.

In step 610, an "Acknowledgement of Control Transfer" message is sent from the FVCG to the DCS. An acknowledgement message includes the following data:

| Destination Address | Source Address | Message Overhead | Acknowledgment Type (1) |
|---|---|---|---|

The acknowledgement type (1) can either be an acknowledgement of the control transfer request, an acknowledgment of the requested time to drop control, an acknowledgment of the criticality level, an acknowledgment of system parameter status, an acknowledgment of a system parameters update message, or an acknowledgment of the control dropped message.

In step 610, an "Acknowledgement of Control Transfer" message is sent from the FVCG to the DCS. An acknowledgement message includes the following data:

| Destination Address | Source Address | Message Overhead | Acknowledgment Type (1) |
|---|---|---|---|

The acknowledgement type (1) can either be an acknowledgement of control transfer request, an acknowledgment of the requested time of transfer, an acknowledgment of the criticality level, an acknowledgment of received system parameters, an acknowledgment of received system update message, or an acknowledgment of control dropped message.

Similarly, in step 615, an "Acknowledgment of Time of Transfer" message is sent from the FVCG to the DCS. In step 620, an "Acknowledgment of Criticality Level" message is sent from the FVCG to the DCS.

In step 625, a "System Parameter Status" message is sent from the FVCG to the DCS. A system parameter status message, and the related system parameters update message, includes the following data:

| Destination Address | Source Address | Message Overhead | System Parameters Status/Update Message (1), (2) | Timing Synchronization Check |
|---|---|---|---|---|

The systems parameters status message (1) provides the current status of each piece of equipment or instrument involved in the transfer of control. The system parameters update message (2) provides notification when the status of a particular instrument or equipment is changed.

The timing synchronization check provides an exchange of local time to the destination and source devices to ensure correct timing of the control exchange.

In step 630, an "Acknowledgement of System Parameter Status" message is sent from the FVCG to the DCS. Acknowledgment messages have been described in step 610, above.

In step 635, an "Update Before Transfer" message is sent from the DCS to the FVCG.

In step 640, an "Ack-Update-Before-Transfer" message is sent from the DCS to the FVCG.

In step 645, a "Control to be Dropped" message is sent from the FVCG to the DCS. This is a control exchange message, which includes the following data:

| Destination Address | Source Address | Exchange Mode (1) | Timing Synchronization Check (2) |
|---|---|---|---|

The exchange mode (1) can be either a "control to be dropped" message, as in the case of step 645, a "control taken" message indicating that the secondary device has taken control, or a "control dropped" message indicating that the primary device has ceded control to the secondary device.

As described earlier, the timing synchronization check (2) provides an exchange of local time to the destination and source devices to ensure correct timing of the control exchange.

In step 650, a "Control Taken" message is sent from the DCS to the FVCG, signifying that the DCS has taken control. Note that this message is sent at predetermined time $T_D$. In step 655, a "Control Dropped" message is sent from the FVCG to the DCS, confirming that the FVCG is no longer in control.

In step 660, an "Acknowledgment of Control Dropped" message is sent from the DCS to the FVCG. Acknowledgment messages were described previously, for step 610.

Thus, steps 625, 630 and 635 described messages communicating system parameter status, acknowledgment of such, and "update before transfer" messages. These are intended to synchronize the DCS and FVCG systems in terms of the most up-to-date parameters. The "control to be dropped" message of step 645 indicates that the FVCG will transfer control to the DCS at time $T_D$ and after execution of a function instructing the DCS to take control. Acknowledgment is then received that the DCS is aware that FVCG will drop the control function at time $T_D$. Thus, step 645 ensures a smooth handoff. In step 650, the DCS informs the FVCG that the DCS has taken the control at time $T_D$ and then, and only then, will the FVCG drop the control function, as described in step 655. That is, the FVCG cannot drop a control function until that control function is taken by the DCS, as a control function cannot be unattended. Conversely, the invention guarantees that there will not be two controllers governing one process.

One additional type of message is possible. This message, not shown in the example illustrated in FIG. 6, is a "Time to Transfer Control Change Request" message, which includes the following data:

| Destination<br>Address | Source<br>Address | Time to Transfer<br>Control Function<br>(1) | Timing<br>Synchronization<br>Check (2) |
| --- | --- | --- | --- |

This message requests a change of the time previously selected to transfer the control function. The time change could be either earlier or later than the previously selected time. For example, a FVCG might want a transfer of control to occur at a particular time, while the DCS might prefer a different time due to other activity such as a system upgrade, downloading patches, etc.

As described earlier, the timing synchronization check, (2), provides an exchange of local time to the destination and source devices to ensure correct timing of the control exchange.

Figure 8:
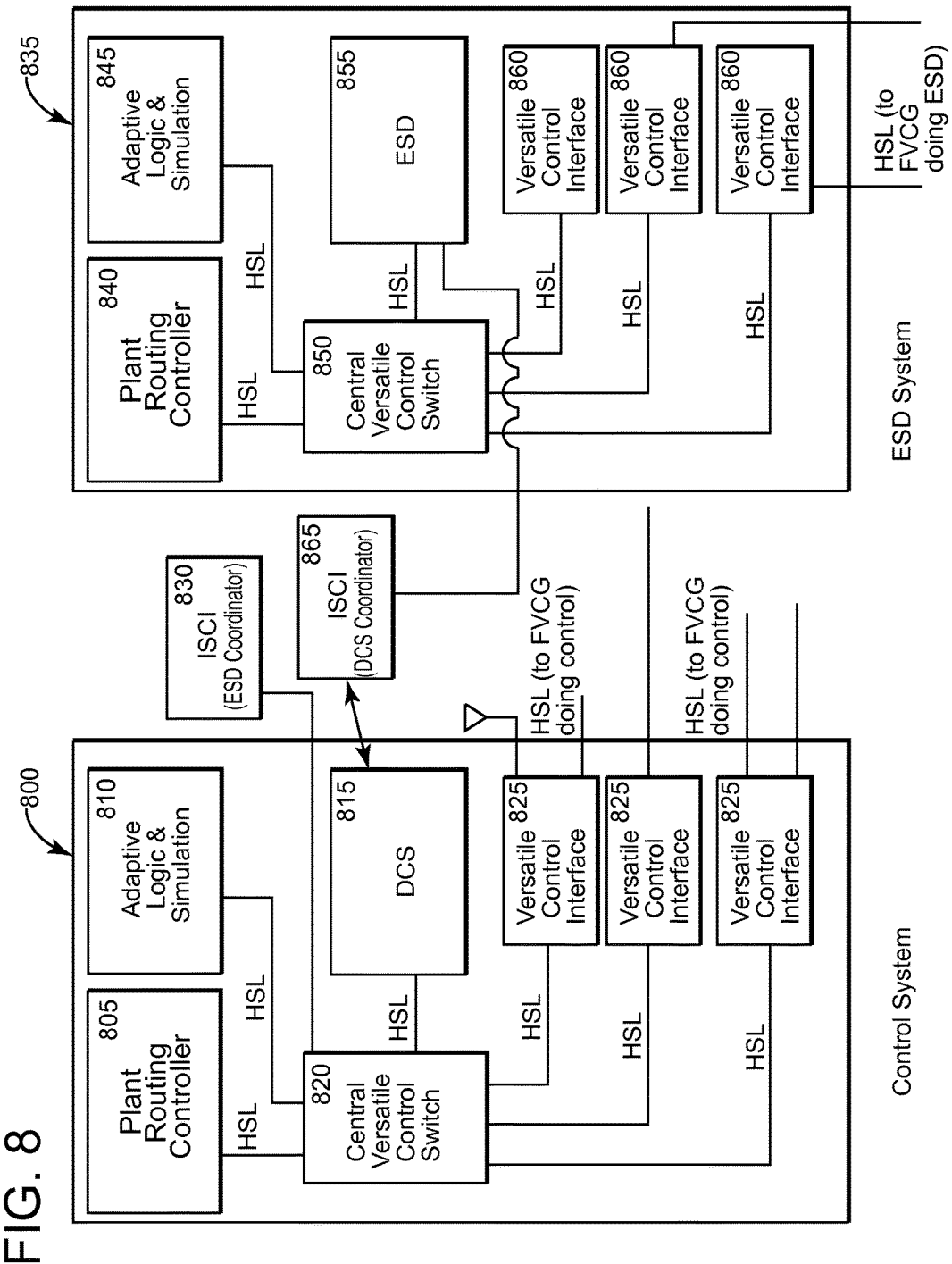
FIG. 8 illustrates proposed connectivity between a DCS and ESD controller.

FIG. 8 schematically illustrates a connection between a control system 800 and emergency shutdown system 835. In the control system 800, the DCS 815 is connected to central versatile control switch 820, which also connects to a plant routing controller 805, an adaptive logic & simulation unit 810, versatile control interfaces 825, and an intelligent safety and control integrator (ISCI) 830. In the emergency shutdown system 835, the ESD controller 855 is connected to central versatile control switch 850, which also connects to a plant routing controller 840, an adaptive logic & simulation unit 845, versatile control interfaces 860, and an intelligent safety and control integrator (ISCI) 865. U.S. Pat. No. 8,645,888 is incorporated by reference, disclosing certain aspects of the interconnection between a control system and an ESD system.

While preferred embodiments of the present invention have been illustrated and described herein, it will be apparent that such embodiments are provided by way of example only. Numerous variations, changes and substitutions also be apparent to those skilled in the art without departing from the invention, the scope of which is to be determined by the following claims.

We claim:

1. A process control system, comprising:
   a. a plurality of field versatile control gateways (FVCGs) that interface with field devices, each of the plurality of FVCGs comprising a microprocessor, memory, routing database, routing module, protocol translator, wireless interface card and antenna,
      wherein the FVCGs provide for control-in-the-field capabilities, and
      wherein the FVCGs communicate with field devices using one or more protocols selected from the group 4-20 mA, Fieldbus Foundation H1, on/off interface, wireless, and serial, EI, and
      wherein the FVCGs provide for multiplexed communication of data between the FVCGs and a central control location via one or more of a hardwired HSL protocol, a wireless connection, or a hardwired HSL protocol and wireless connection, and
      wherein the routing database and routing module provide for routing of data between the field devices and the FVCG microprocessor and between the FVCG microprocessor and a central control location, and
      wherein the protocol translator provides for conversion of field device data from 4-20 mA, Fieldbus Foundation H1, serial, EI, and on/off interface protocols into HSL protocol for communication with the central control location;
   b) a plurality of versatile control interfaces, located in the central control location, that collect data that is transmitted to and from the FVCGs;
   c) a central versatile control switch, located in the central control location, that collects data transmitted to and from the versatile control interfaces and that interfaces with a distributed control system; and
   d) a plant routing controller, located in the central control location, that provides supervisory control of the routing of data within the process control network; and
   e) and an interface with a distributed control system (DCS) and an emergency shutdown (ESD) controller.

2. The process control network of claim 1, wherein one or more of the plurality of FVCGs communicate with one or more other FVCGs via HSL or a wireless protocol.

3. The process control network of claim 1, wherein each of the plurality of FVCGs includes an alarm module that monitors the health of the communications channel between the FVCG and each field device, and between the FVCG and associated versatile control interface, and reports any faults detected to the CCR and/or PIB and assigns an alternative available healthy communication path for data transfer.

4. The process control network of claim 1, wherein one or more of the plurality of FVCGs that is communicating with an associated FVCG includes an alarm module that monitors the health of the communications channel or channels between the FVCGs, reports any faults to the CCR and/or PIB and assigns an available healthy communication path between the FVCGs for data transfer, and assigns an alternative healthy communication path between the FVCGs for data transfer if the main assigned communication path health quality degrades.

5. The process control network of claim 1, wherein the central versatile control switch accesses and shares emergency shutdown and DCS data via a mapped Intelligent Safety and Control Integrator (ISCI) interface.

6. The process control network of claim 1, wherein the logic-in-the-field capabilities includes the use of an FVCG to perform local control functions, including a local emergency shutdown function.

7. The process control network of claim 1 in which the DCS is the primary control system and the FVCG is activated as the primary control system in the event of DCS failure or malfunction, or in the event of failed or degraded communications on the DCS.

8. The process control network of claim 1 in which the FVCG is the primary control system and the DCS is activated as the primary control system in the event of a failure or degraded communications on the FVCG.

9. The process control network of claim 1 in which a central logic solver is the primary emergency shutdown control system and the FVCG is activated as the primary emergency shutdown control system in the event of a failure of the central logic solver or degraded communications between the central logic solver and the FVCG.

10. The process control network of claim 1 in which the FVCG is the primary emergency shutdown control system and a central logic solver provides for secondary emergency shutdown control in the event of failure of the FVCG or degraded communications between the central logic solver and the FVCG.

11. The process control network of claim 1, wherein the central versatile control switch supports double or triple redundancy.

12. The process control system of claim 1, wherein the ESD controller performs an emergency shutdown function upon demand, and wherein one or more of the plurality of FVCGs performs logic-in-the-field functions for equipment that is geographically remote from the plant control room.

13. The process control system of claim 1, wherein the ESD controller performs an emergency shutdown function upon demand, and wherein one or more of the plurality of FVCGs performs logic-in-the-field functions to provide redundancy in the event the ESD controller emergency shutdown function is not performed because of communications failure or degradation.

14. The process control system of claim 1, wherein the DCS includes an alarm module that monitors the health of the FVCG, reports any faults to the CCR and/or PIB, and transfers the FVCG's control-in-the-field functions back to the DCS if the FVCG health quality degrades.

15. The process control system of claim 1, wherein the ESD controller includes an alarm module that monitors the health of the FVCG, reports any faults to the CCR and/or PIB, and transfers the FVCG's logic-in-the-field functions back to the ESD controller if the FVCG health quality degrades.

16. The process control system of claim 1, wherein the logic-in-the-field capabilities includes a plurality of FVCGs to perform a sequential local emergency shutdown function for multiple pieces of equipment.

\* \* \* \* \*